United States Patent [19]
Miller

[11] 3,869,165
[45] Mar. 4, 1975

[54] VEHICLE WITH REINFORCED IMPACT-ABSORBING END PORTION

[75] Inventor: Michael Clendenin Miller, Morse, Germany

[73] Assignee: Volkswagenwerk Aktiengesellschaft, Wolfsburg, Germany

[22] Filed: Apr. 18, 1973

[21] Appl. No.: 352,327

[30] Foreign Application Priority Data
June 19, 1972 Germany............................ 2229782

[52] U.S. Cl.................. 293/63, 293/71 R, 267/140
[51] Int. Cl............................................. B60r 19/08
[58] Field of Search .............. 293/1, 60, 62, 63, 64, 293/65, 66, 67, 69 R, 69 V, 70, 71 R, 71 P, 80, 81, 82, 83, 85, 86, 87, 88, 95, 97, 99; 267/116, 139, 140; 296/28 R, 31 P

[56] References Cited
UNITED STATES PATENTS
2,074,469  3/1937  Haynes ................................ 293/63
2,965,403  12/1960  Barenyi et al........................ 293/63

FOREIGN PATENTS OR APPLICATIONS
821,254  10/1959  Great Britain ....................... 293/63
1,289,441  2/1969  Germany .............................. 293/63

Primary Examiner—M. Henson Wood, Jr.
Assistant Examiner—Robert Saifer
Attorney, Agent, or Firm—Brumbaugh, Graves, Donohue & Raymond

[57] ABSTRACT

An independent vehicle body end portion is made of resilient material and has an integrated transversely extending reinforcement and a buffer arrangement for absorbing impacts. The buffer arrangement includes a bumper and at least one shock absorber that extends between the bumper and the vehicle undercarriage. The transversely extending reinforcement is constituted by the bumper.

8 Claims, 6 Drawing Figures

VEHICLE WITH REINFORCED IMPACT-ABSORBING END PORTION

BACKGROUND OF THE INVENTION

The present invention relates generally to vehicles and, more particularly, to automotive vehicles having independent body end portions formed of resilient materials and including integrated transversely extending reinforcements.

In vehicles of this type, which are shown, for example, in the West German published patent application No. 1,630,385 of Apr. 29, 1971, the reinforcements are either localized or surround the vehicle end portion. Such reinforcements, however, serve only to strengthen the end portion itself.

SUMMARY OF THE INVENTION

There is provided, in accordance with the invention, an improved vehicle end portion having a transversely extending reinforcement wherein the reinforcement is constituted by a bumper. The bumper is a part of a buffer arrangement having shock absorbers extending between the bumper and the undercarriage of the vehicle. Thus, the bumper is integrated with the vehicle body end portion, which portion may be formed of a resilient material, such as rubber or plastic, that will yield on impact. In this way, the bumper does not appear outside the body. The bumper arrangement may thereby be used as support for the vehicle end portion, either alone or in conjunction with additional vehicle support members. It is possible to fasten the end portion to other parts of the vehicle body. However, such fastening must be effected in such a manner as to not to degrade the resiliency of the end portion on impact.

The use of self-regenerating shock absorbers such as hydraulic shock absorbers, is especially suitable in the present invention since the return of the body end portion, which is formed of a resilient material, is thereby ensured in impact situations not exceeding predetermined intensities.

In addition to rubber, materials suitable for use in the body and portion include synthetic materials, such as hard and soft aerated (foamed) plastics. Additionally, it may be of advantage to form the end portion of several members of varying elasticity or resilience; for example, a grill, such as a radiator grill, would be formed of a more rigid material than the members of the end portion projecting beyond the grill.

Should the body end portion be the front end of a vehicle, it will be advantageous to provide at least one opening for a light, e.g., a headlight, which may be secured directly to the bumper. Especially if a self-regenerating impact absorbing arrangement is employed, the headlight will deflect with the bumper on impact and will resume its previous position when the shock has been neutralized.

It is also within the scope of the present invention to use shock absorbers that permanently deform on impact. After the deformed shock absorbers have been replaced, the end portion of the vehicle regains its original form.

The invention offers the advantage, however, that vehicles in collision while travelling at low speeds are largely undamaged and that repairs, if any, are limited to a comparatively small and low-cost area of the body. In addition, the end portions of the body may be designed with various shapes so that by exchanging the end portions, in accordance with the invention, variations in form may be realized for the vehicle body. It is advantageous that this design freedom is not impaired by the need to arrange a bumper in front of the body since, as described above, the bumper is integrated into the vehicle body end portion.

A BRIEF DESCRIPTION OF THE DRAWINGS

A better understanding of the invention can be gained from a consideration of the following description of exemplary embodiments, in conjunction with the appended figures of the drawings, wherein.

DESCRIPTION OF THE PREFERRED EMBODIMENTS

Figure 1:
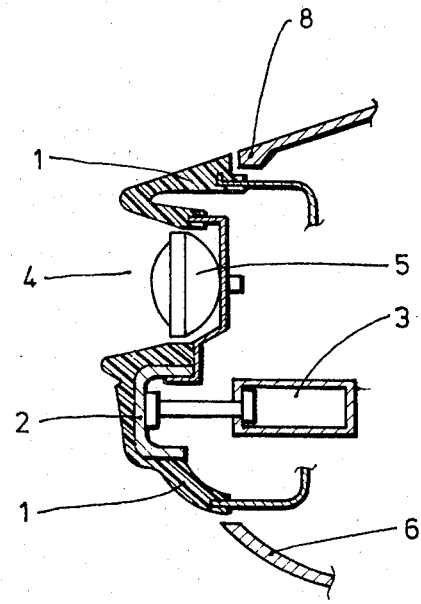
FIG. 1 is a partially representational, longitudinal cross-section view through the front end of a vehicle.

Referring to FIG. 1, the front end of a vehicle, provided with a body end portion in accordance with the invention, is shown in its normal, non-deflected condition. Although the figures show only the front end of a vehicle, the principles of the present invention are equally applicable to a vehicle rear end.

The front end comprises members 1 made of a resilient material that yields on impact and a bumper 2 integrated with the material that has a U-shaped profile and that opens towards the vehicle in the customary manner. The bumper 2 is a component of an impact absorbing arrangement that also includes at least one shock absorber 3, shown as a hydraulic shock absorber, extending between the bumper 2 and the undercarriage of the vehicle, not shown. Although only one shock absorber is shown, a vehicle will customarily use two such devices.

The resilient material 1 contains an opening 4 behind which are arranged the headlights 5 that are mounted on the bumper 2. Otherwise, the body end portion is formed in such a manner that its form joins the rest of the body without discontinuity. Thus, the upper, approximately lip-shaped portion of the resilient material 1 is flush with the engine hood 8 whereas the bottom part of the resilient material 1 extends into the underside cover 6.

Figure 2:
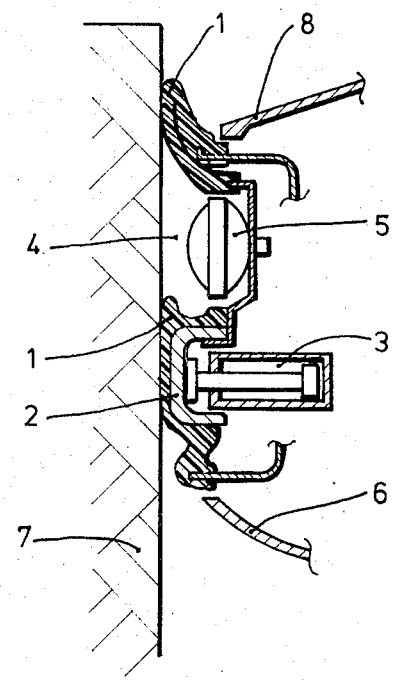
FIG. 2 is a view of the vehicle of FIG. 1 upon impact.

FIG. 2 shows the vehicle of FIG. 1 on impact with an obstacle 7. Due to the impact, which is of relatively low intensity, there occurs an elastic deformation of the resilient material 1 and a compression of the shock absorbers 3 without any permanent damage to the end portion and the impact absorbing arrangement. Since the light 5 is mounted on the bumper 2, which recedes on the impact, the headlight 5, too, remains undamaged. If regenerating shock absorbers 3 are used, the headlight returns to its previous position, as shown in FIG. 1, together with the bumper 2 after the impact is neutralized.

Figure 3:
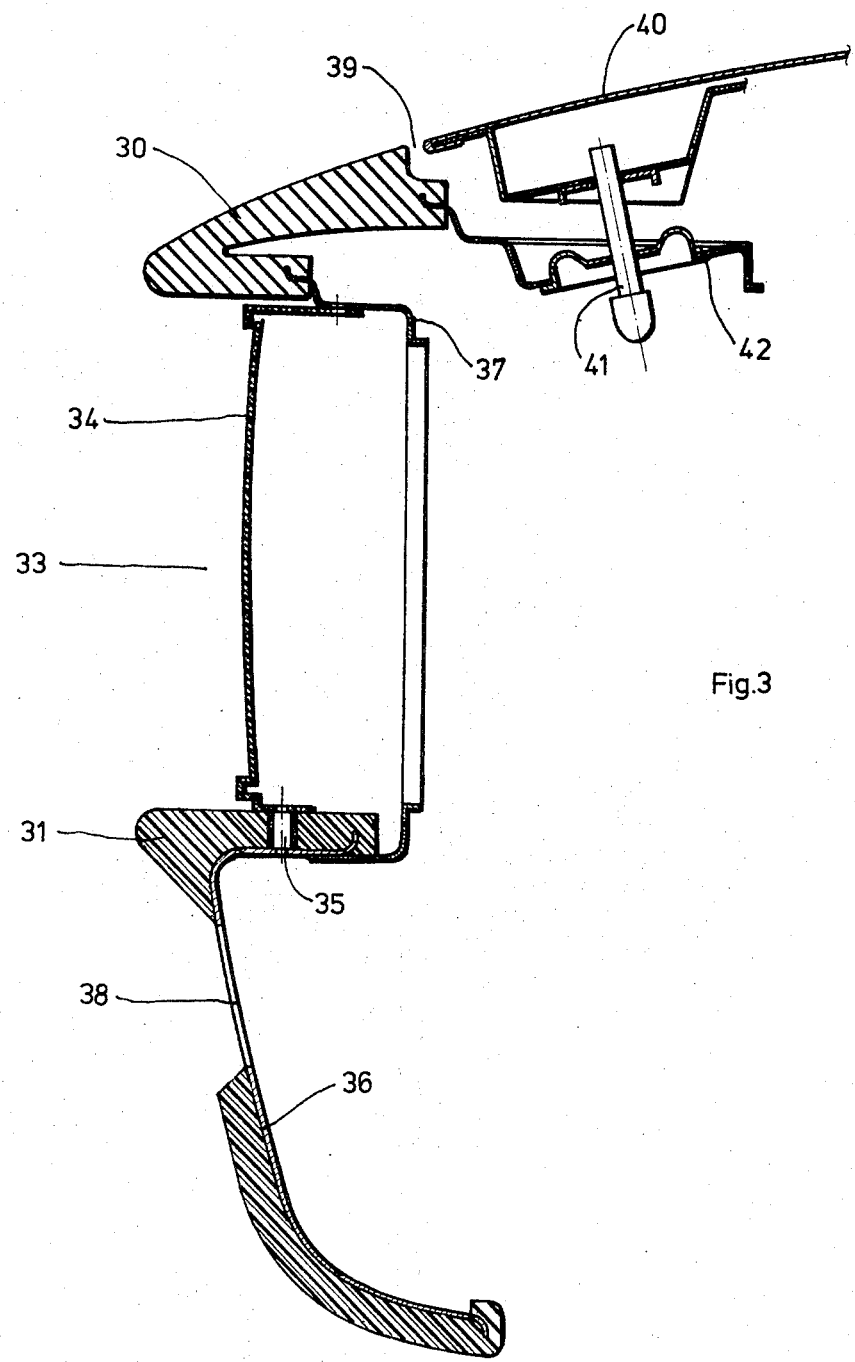
FIG. 3 is a partial, longitudinal, cross-sectional view through the center of the front end of a vehicle.
Figure 4:
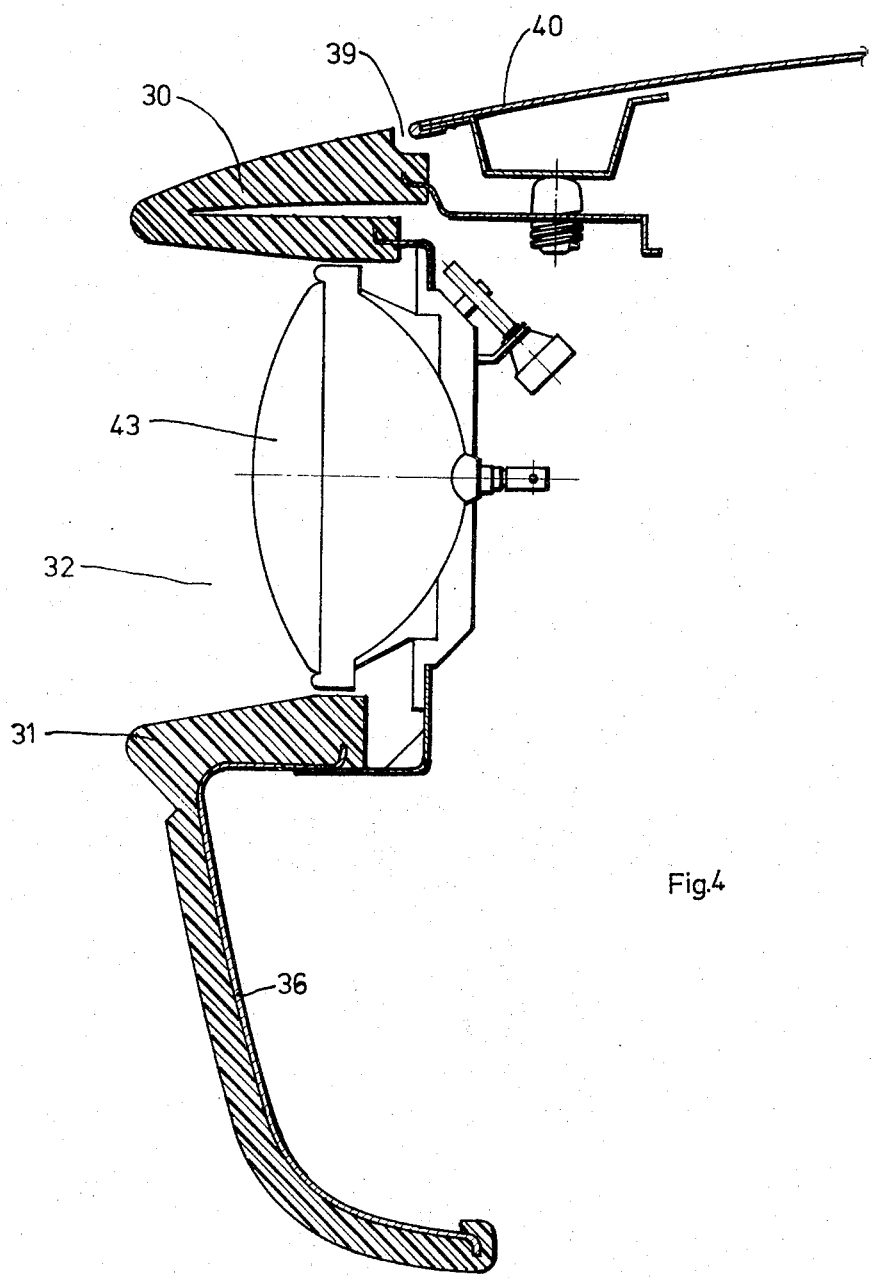
FIG. 4 is a partial, longitudinal cross-sectional view of the vehicle shown in FIG. 3 taken along a plane near one headlight.

FIGS. 3 and 4 represent in some detail a construction which is based on the embodiment shown in FIGS. 1 and 2. The members 30 and 31 of the end portion are formed of rubber or some soft plastics. In the embodiment of FIGS. 3 and 4, they constitute a closed element that is provided with openings 32 for headlights and an opening 33 for the inserted grill 34, formed of some harder material such as a hard aerated plastic. The grill 34 is incorporated at 35 into the member 31 and bumper 36, which is integrated with the member 31. In the upper region of the grill insert 34 there is provided a support plate 37, which is rigidly connected to the member 30, e.g., by means of an adhesive.

Similar to the bumper 2 shown in FIGS. 1 and 2, the bumper 36, shown in FIGS. 3 and 4, is connected by way of shock absorbers to the undercarriage of the vehicle; for clarity purposes, the shock absorbers and vehicle undercarriage are not shown in FIGS. 3 and 4. As shown in FIG. 3, an opening 38 is provided in both the bumper 36 and the resilient member 31.

The upper portion of FIGS. 3 and 4 show that the end portion 30 provides a smooth transition, except for a relatively small gap 39, with the engine or luggage compartment lid 40, which has a locking bolt 41 in the customary manner that projects into a lock support 42.

Referring to FIG. 4, the headlight 43 is secured on the bumper 36 and, therefore, upon an impact to the vehicle and deflection of the bumper 36, the headlight 43 also deflects, as described above. The headlight thereby protected against damage and, if the shock absorbers are self-regenerating, the headlight automatically returns to original position after the impact is neutralized.

As shown in FIG. 4, the opening 32 is delimited by approximately lip-shaped projections of the resilient members 30 and 31 so that very slight contact of the vehicle with other objects, such as persons, results in only localized deformation of these members without the immediate response of the shock absorbers.

Moreover, FIGS. 3 and 4 show that a modification of the shape of the vehicle body becomes possible in an extremely simple manner by exchanging the end portions in accordance with the invention. The exchange is facilitated in that, in the embodiment illustrated, the member 31 is fitted on the bumper 36 and is detachable.

Figure 5:
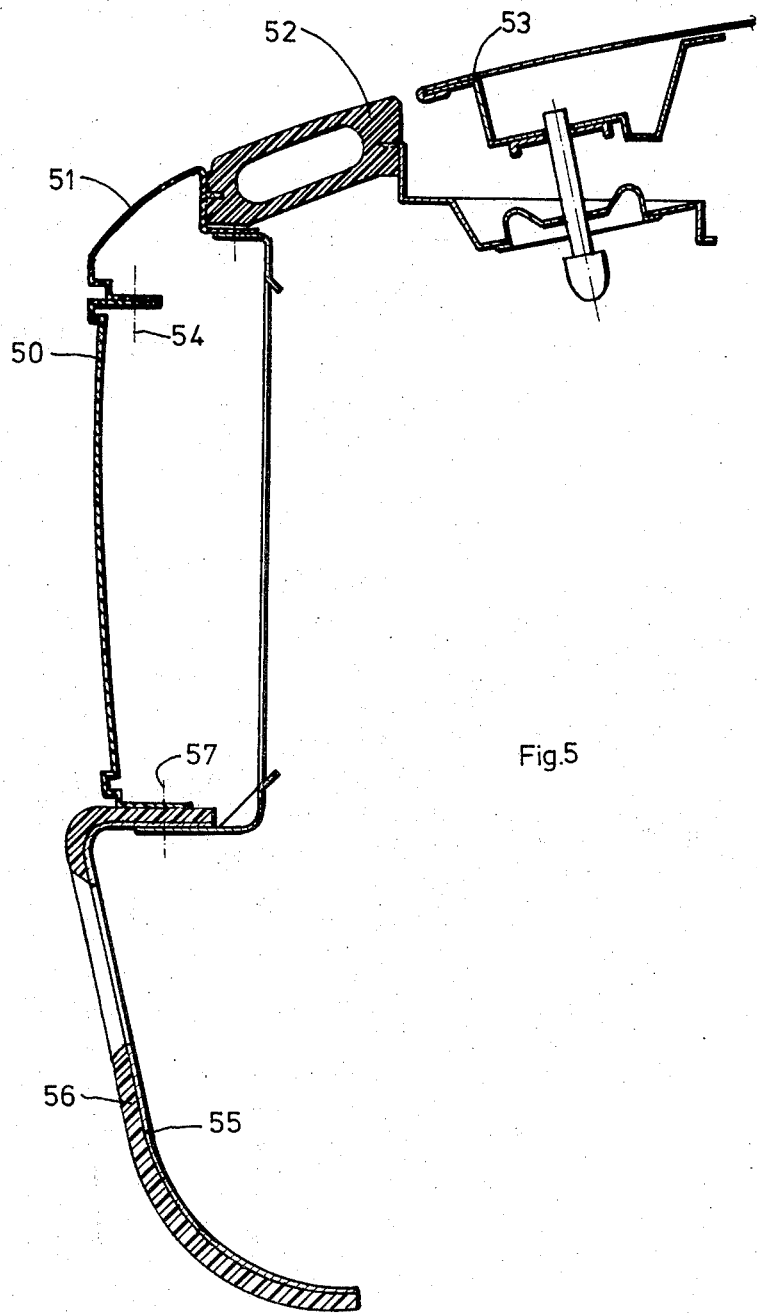
FIG. 5 is a partial, longitudinal, cross-sectional view taken through the center of a vehicle and showing a further embodiment of the invention.
Figure 6:
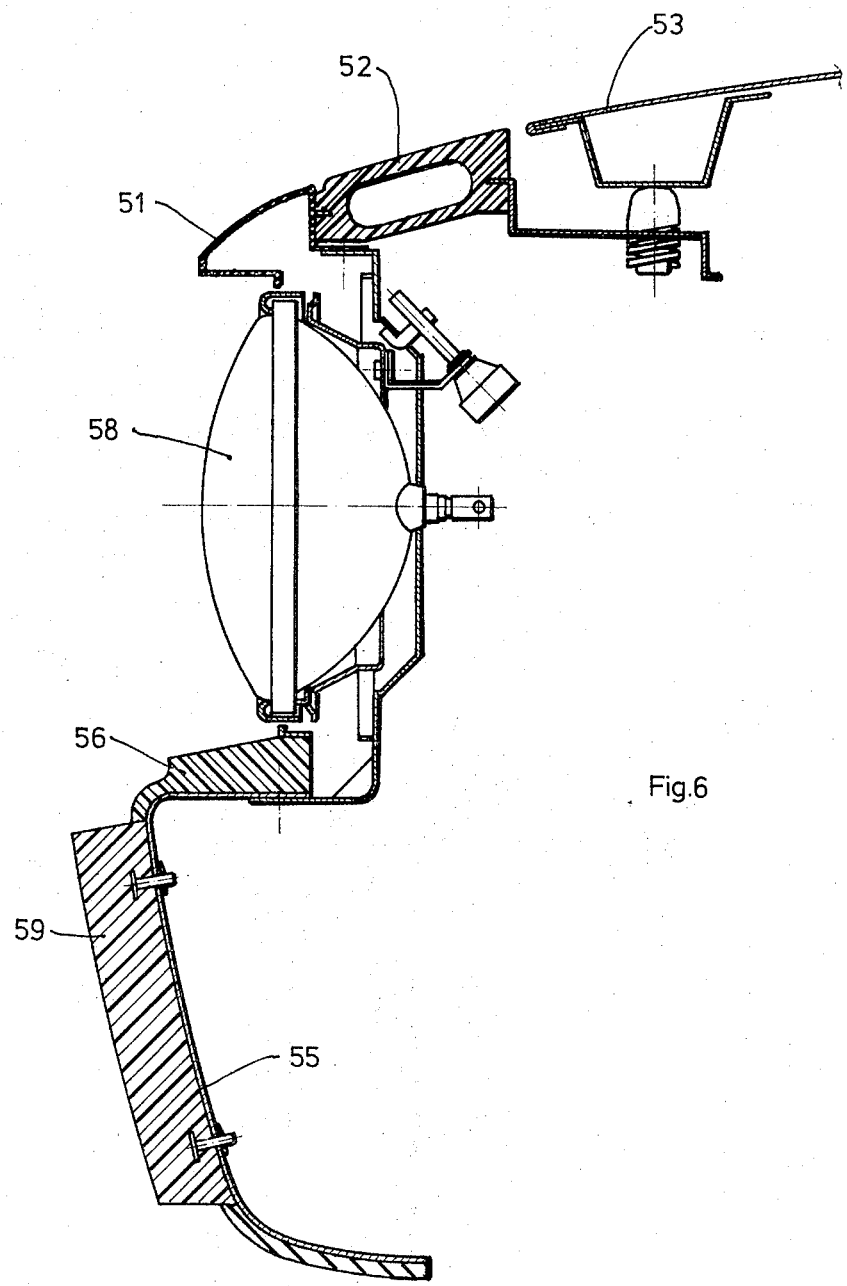
FIG. 6 is a partial, longitudinal, cross-sectional view of the vehicle shown in FIG. 5 taken along a plane near one headlight.

FIGS. 5 and 6 show an end portion that comprises a larger number of elements having different resiliency characteristics than in the previous embodiments. In FIG. 5, the grill insert 50 is connected by way of a surrounding element 51, made of hard polyvinyl chloride, with a spacer 52, made of a soft plastic, which forms the transition to a lid 53. The various parts are connected by cementing and at 54 by bolting together. Below the grill insert 50 is placed the bumper 55, which is covered by a layer 56 of hard aerated plastic. At 57, a bolted connection is made between the grill insert 50, the hard aerated plastic layer 56 and the bumper 55, which is, in-turn, connected to the undercarriage of the vehicle by means of shock absorbers (not shown). Referring to FIG. 6, a rubber buffer 59 in the zone of the headlight 58, is secured on the bumper 55. In the embodiment of FIG. 6, the rubber buffer 59 is that part of the end portion which projects furthest forward. The parts already mentioned in connection with FIG. 5 are designated by the same reference numerals in FIG. 6.

In the embodiment of FIGS. 3 and 4, there are resilient projections above and below the grill insert and the headlights (on members 30 and 31, respectively). In the embodiment of FIG. 6, however, such resilient projections, in form of the rubber buffer 59, are shown only below the headlights 58.

The above described embodiments show that, in accordance with the present invention, rubber or plastic members, which are designed to yield or are yieldingly secured on the vehicle proper, form a facing for a bumper, which is, in turn, yieldingly supported on the vehicle undercarriage by means of shock absorbers. In the embodiment of FIGS. 5 and 6, elasticity is ensured by the spacer 52 notwithstanding the fact that the member 51 consists of some hard material; while in the embodiment of FIGS. 1 and 2, the projecting portions themselves consist of a soft, resilient material.

Although the invention has been described with reference to specific embodiments thereof, many modifications and variations of such embodiments may be made by those skilled in the art without departing from the inventive concepts disclosed. Accordingly, all such modifications and variations are intended to be included within the spirit and scope of the appended claims.

I claim:

1. In a vehicle, such as an automobile, comprising an undercarriage; a main body portion; an independent body end portion made of resilient material and having an integrated, transversely extending reinforcement, all of the parts of said end portion being interconnected to form a unit; and impact absorbing means including a transversely extending bumper and at least one shock absorber extending between said bumper and said undercarriage, the improvement wherein said reinforcement of said end portion is constituted by said bumper; wherein said end portion is an extension of said main body portion forming, at the transition, a smooth continuous body surface; and wherein said end portion is deformable in and of itself so that, upon impact, said end portion will deform and subsequently return to its original shape.

2. The vehicle defined in claim 1 wherein said at least one shock absorber is self-regenerating.

3. The vehicle defined in claim 1 wherein at least one light is arranged within the body of the vehicle behind an opening in said end portion.

4. The vehicle defined in claim 1 wherein said impact absorbing means forms a support for said end portion.

5. The vehicle defined in claim 1 wherein said end portion comprises a plurality of members of various degrees of resiliency.

6. The vehicle defined in claim 5, wherein said end portion includes a grill member made of comparatively hard material and at least one member surrounding and projecting beyond said grill member made of comparatively soft material.

7. The vehicle defined in claim 1, wherein said resilient material is rubber.

8. The vehicle defined in claim 1 wherein said resilient material is plastic.

* * * * *